July 13, 1954

D. C. STEELE

2,683,390

SOUND REPRODUCER AND IMAGE PROJECTOR COMBINATION

Filed July 26, 1949

Inventor
Don Carlyle Steele
By The Firm of Charlesworth
Attys

July 13, 1954  D. C. STEELE  2,683,390
SOUND REPRODUCER AND IMAGE PROJECTOR COMBINATION
Filed July 26, 1949  5 Sheets-Sheet 3

Inventor
Don Carlyle Steele
By The Firm of Charles W. Hills Attys

July 13, 1954

D. C. STEELE

2,683,390

SOUND REPRODUCER AND IMAGE PROJECTOR COMBINATION

Filed July 26, 1949

Inventor
Don Carlyle Steele
By The Firm of Charles W Hills Attys

Patented July 13, 1954

2,683,390

UNITED STATES PATENT OFFICE 2,683,390

SOUND REPRODUCER AND IMAGE
PROJECTOR COMBINATION

Don Carlyle Steele, Washington, D. C.

Application July 26, 1949, Serial No. 106,940

14 Claims. (Cl. 88—27)

This invention relates to improvements in a combined record player and slide projector and more particularly to a device capable of effecting amplified reproduction from a previously made recording and at the same time periodically project visual picturizations in synchronism and harmony with the subject matter being reproduced from the record, the invention having a multitude of various uses as will be apparent to one skilled in the art.

In the past, many and various record playing devices for home use, as well as elsewhere, were developed but such devices merely reproduced with or without amplification from the previously made record. Many and various forms of slide projectors have also been devised, but those projectors merely accomplished their single purpose of projecting a slide or film mounting upon a screen. Wherever record players and slide projectors have been used in unison, two separate sets of apparatus were necessary, and if the player was connected to the slide projector, synchronism was exceptionally difficult to establish, and in all instances of which I am aware, an operator was necessary. This latter mentioned form of apparatus was prohibitively expensive for home usage except in rare instances.

Insofar as I am aware, no combined record player and slide projecting device has as yet been provided, and especially one that may be sufficiently economical to warrant its usage in the majority of homes as well as in other locations. It is a prime object of this invention to provide such a device.

Another important object of this invention is the provision of a combined record player and slide projector in which all movable parts immediately associated with the playing of a record and all movable parts immediately associated with the projection of slides in succession are all operated by the same prime mover whereby synchronism between the reproduction of the record program and the successive showing of the slides is always maintained.

Also an object of this invention is the provision of a single unitary self-contained device capable of reproducing previously made recordings, and automatically projecting slides upon a visual screen in synchronism with the playing of the record to illustrate the recorded program, all without the aid of an operator, except to change records when necessary.

Still a further object of this invention resides in the provision of a combined record player and slide projecting device by means of which slides may be projected in synchronism with the playing of a record upon a screen carried by the device itself, or upon a screen located elsewhere in the room, if so desired.

It is also a feature of this invention to provide a unitary combined record playing and slide projecting device which, at the will of the user, may be operated to both reproduce from a record and project slides in synchronism with the reproduction, or to reproduce from standard records only.

Another feature of this invention is the provision of a combined record playing and projecting device, in which the slides to be projected are actually carried by the record being played when in use, when not in use, or both.

It is also a feature of this invention to provide a device for playing disc type records and projecting slides in synchronism with the playing of the record; embodying a novel slide indexing mechanism operated from the turntable for the record.

The present invention also contemplates the provision of a novel record and slide assembly, wherein the record and slide holder may remain attached together at all times and handled in substantially the same manner that the record alone might be handled, thus eliminating any chance of the proper slides becoming separated from the particular record.

This invention also contemplates the provision of a novel record and slide assembly, wherein the record and slide holder may remain joined together at all times, with the slide holder embodying a different complement of slides for each side of the record.

Another object of the invention is the provision of a novel record and slide holder assembly, wherein when in use both relative and joint rotation occurs between the record and slide holder, and yet the record and slide holder assembly may be handled and operated as a single unit substantially in the manner a record alone is handled.

Still a further feature of the invention resides in the provision of a novel record and slide holder assembly in which the slide holder is loosely attached to and circumscribes the record, the engagement between the slide holder and record being such that the record may rotate relatively to the slide holder when the slide holder is restrained from movement, and the slide holder will rotate with the record when the restraint is removed.

While some of the more salient features, characteristics and advantages of the instant invention have been above pointed out, others will become apparent from the following disclosures, taken in conjunction with the accompanying drawings, in which—

As shown on the drawings.

Figure 1:
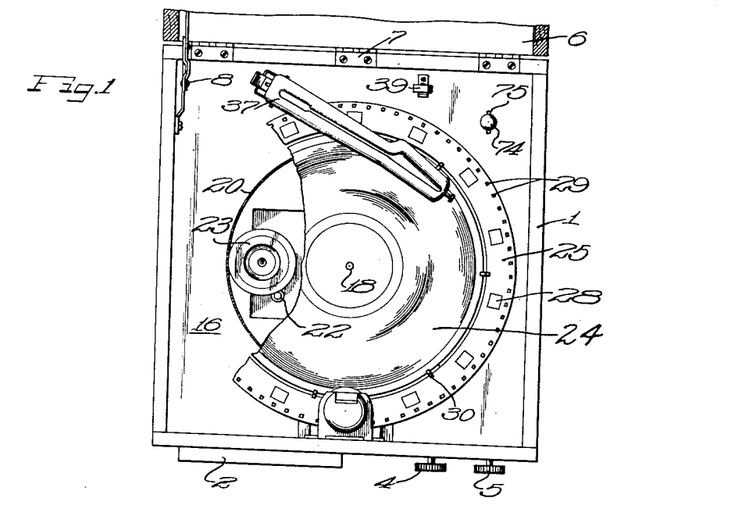
Figure 1 is a fragmentary plan view of a combined record player and slide projector embodying principles of the instant invention, showing the same with the cover elevated, and with parts broken away and parts shown in section.
Figure 2:
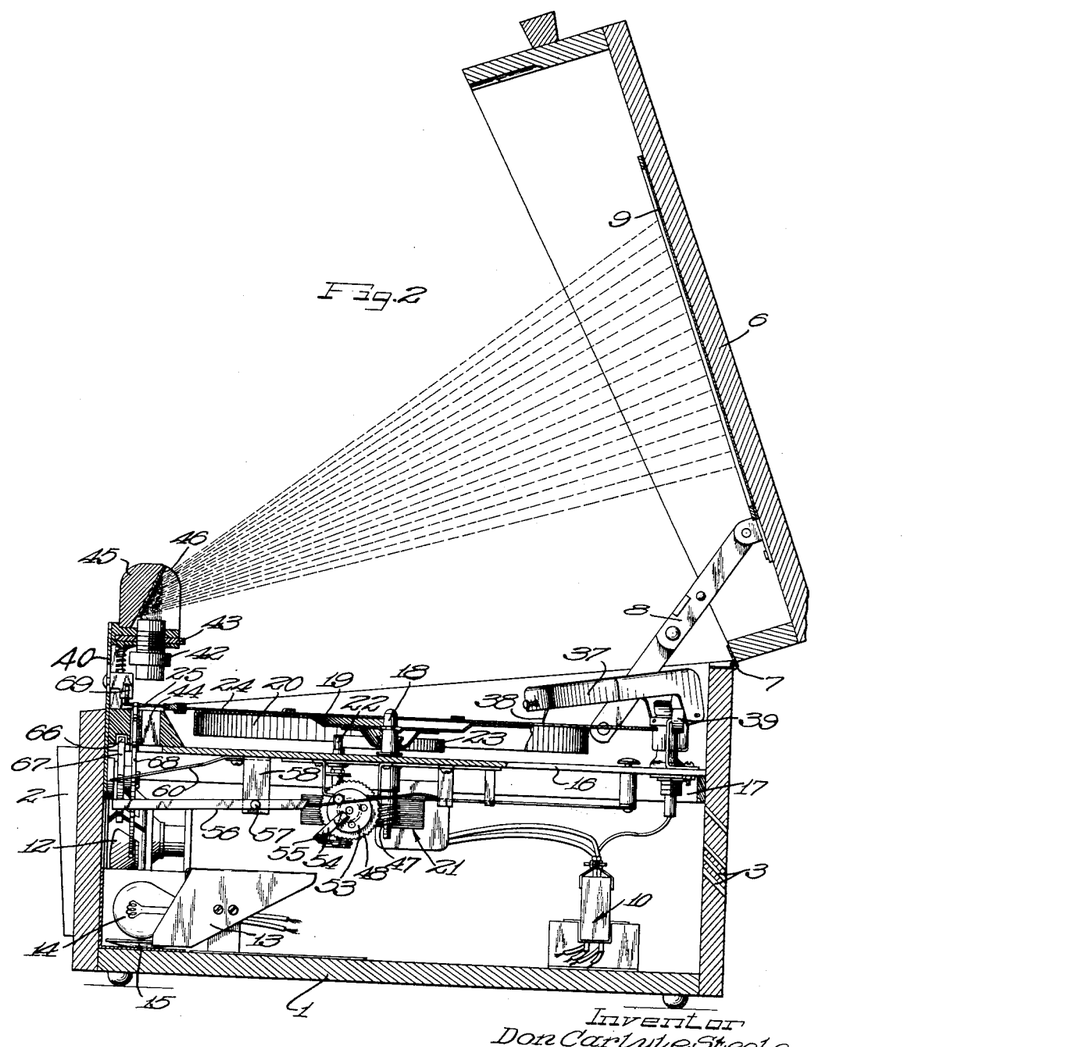
Figure 2 is a longitudinal vertical sectional view of the structure shown in Fig. 1, with parts broken away and parts shown in elevation for purposes of clarity.

The illustrated embodiment of the instant invention is shown contained within a cabinet 1, the front wall of which is provided with an opening defined by a frame 2, and the rear wall of which may have one or more ventilation openings 3 therein if so desired, as best seen in Figs. 1 and 2. The front wall of the cabinet is also provided with suitable apertures through which the shafts of a volume control knob 4 and a switch knob 5 may project, these knobs being connected with a standard form of amplifier disposed inside the cabinet, not shown on the drawings, but indicated in the wiring diagram of Fig. 7.

A suitable cover 6 may be hinged to the cabinet as at 7, and the hinges are preferably of the side slipping type so that the cover may readily be removed from the cabinet when desired. The cover may be supported in elevated position as seen in Fig. 2 by means of a suitable link brace structure 8, which also is preferably connected for easy release from the cover.

As seen especially in Fig. 2, the inside of the cover is provided with a suitable screen 9 of any satisfactory material upon which a picture image may be projected by means to be later described. The provision of the screen inside the cover makes the device self-sufficient in character so that nothing further than the structure within the cabinet is needed, with the single exception of a record to be played. On the other hand, if a larger picture projection is desired, the cover may be removed, and the slides projected upon a separate screen or the ceiling or wall of a room.

Mounted in the lower portion of the cabinet adjacent to or on the floor thereof is a suitable terminal strip and plug and socket arrangement generally indicated by numeral 10 to which the various wires may be connected. In the forward portion of the cabinet adjacent the front wall thereof an amplifier, indicated by numeral 11 in Fig. 7 and not otherwise shown in the drawings, is disclosed, and opposite the opening defined by the frame 2 a loud speaker 12 is mounted which is connected to the amplifier in the usual manner. Between the speaker and the amplifier, with reference to Fig. 2, a lamp mounting 13 is secured to the floor of the cabinet to hold a source of illumination such as an incandescent lamp 14 positioned above a reflector 15 which focuses the light upwardly.

The remainder of the mechanism, or substantially all of it, is preferably carried on a removable partition 16 resting upon a supporting strip 17 running around the inside walls of the cabinet. This partition is, of course, suitably slotted and apertured in an obvious manner to permit the necessary projecting parts of apparatus carried on the underside of the partition to extend through and above the partition.

As best seen in Figs. 1, 2, 3 and 4, a turntable spindle 18 extends through the partition or platform 16 and is mounted for free rotation. The upper end of this spindle supports a turntable 19 having a depending flange 20 therearound, which turntable is obviously a carrier for a disc-type record to be played in the device.

The drive for the turntable, in the illustrated instance, is an electric motor generally indicated by numeral 21 and mounted on the underside of the partition 16. The armature shaft 22 of the motor extends through the partition so as to bear against the circumferential face of a friction drive wheel 23 which is spring biased against the inside face of the flange 20 of the turntable so as to cause rotation of the latter around the spindle 18 and cause that spindle 18 to rotate along with the turntable.

Figure 8:
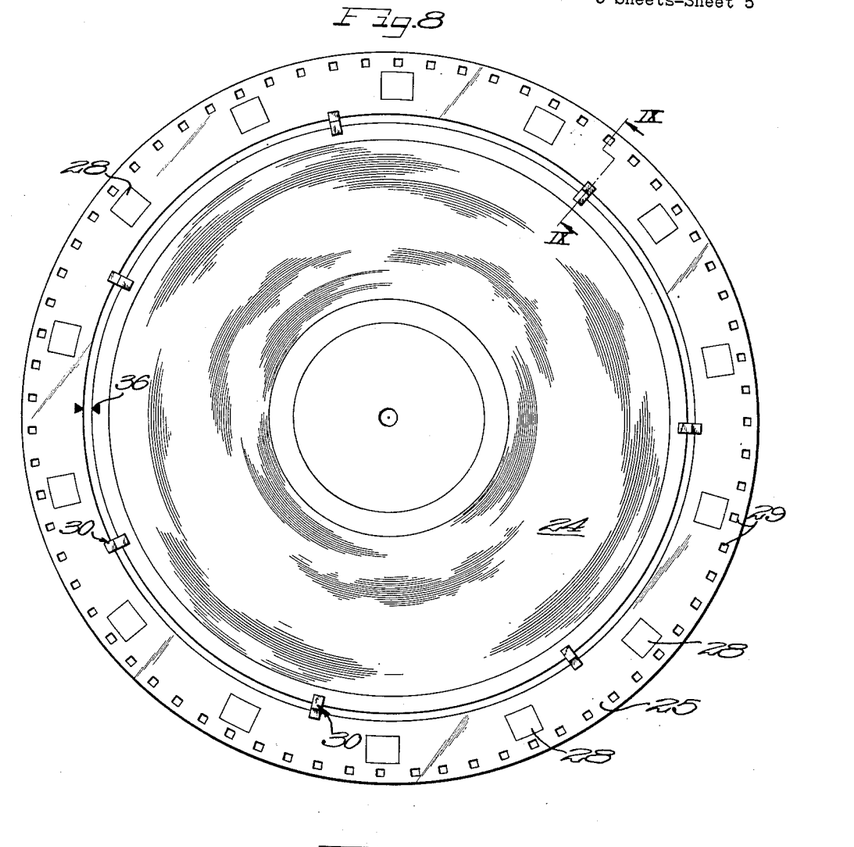
Figure 8 is a plan view of the record and slide holder assembly.
Figure 9:
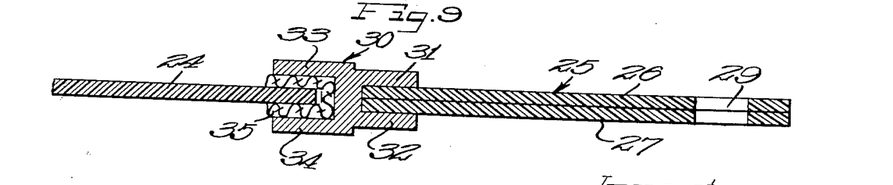
Figure 9 is a greatly exaggerated fragmentary vertical sectional view taken substantially as indicated by the line IX—IX of Fig. 8, looking in the direction of the arrows.

When in use, the turntable carries a disc-type record 24 and associated with this record is a slide carrier. The record and slide carrier assembly is best seen in Figs. 8 and 9. The slide carrier is preferably in the form of a flat ring 25 circumscribing the record. As best seen in Fig. 9, the ring 25, which is preferably of transparent plastic material, may be made up of a pair of laminations 26 and 27 fused, cemented, or otherwise secured together. Between these laminations an annular series of slides may be disposed, each such slide 28 preferably being in the nature of a piece of photographic film or the equivalent bearing a pictorial image in color or in black and white as may be preferred. When the ring-like carrier 25 is made of laminations as illustrated, the film slides are obviously well protected against abrasion or other abuse. Outside the slides 28 the carrier 25 is preferably provided with an annular series of perforations 29 for the reception of the teeth of a sprocket wheel.

The slide carrier ring 25 may be attached to the record 24 by means of a series of clips 30. Each clip has a pair of arms 31 and 32 projecting in one direction to clamp over the adjacent edge of the film carrier ring 25, as clearly seen in Figure 9. Each clip also has a pair of arms 33 and 34 extending inwardly toward the record. The arms 33 and 34, however, are preferably lined with a soft fabric 35, such as felt, so as to avoid any possibility of marring the record, and, more important, eliminate background noise that might be picked up by the reproducer through the needle. The outer edge of the record, that is, the smooth area outside the grooving, seats in the felt socket thus provided by each clip. With this arrangement the record and the film carrier are what may be considered semi-permanently united, and the entire assembly may be handled as a single unit in the manner an individual record is handled. The slide carrier remains on the record throughout the life of the record and is preferably placed in the album when not in use along with the record, just as though the carrier and record were one integral entity.

If so desired, the connection between the slide carrier and the record may be of such permanence that the slide carrier and record cannot be separated without injury to one or the other, and thus, if the record becomes broken, it is necessary to ship the carrier back to the factory for the insertion of a new record. On the other hand, it might also be desirable to have the connection between the slide carrier and the record sufficiently loose to permit the clips to be successively released from the record by bending the flexible plastic slide holder a sufficient extent. Thus, the user himself might replace a broken record.

It should be especially noted that any number of slides, within reason, may be carried by the ring 25, and where a double sided record is utilized, slides for one side of the record may be carried around half the circumference of the ring 25, and slides for the other side of the record carried on the other half circumference. The slides are equally visible regardless of which side of the ring is uppermost, and any suitable form of index mark, such as the aligned arrows at 36 in Fig. 8, may be utilized to properly align the slide holder and record at the start of play.

It should further be especially noted that the frictional grip of the clips 30 upon the record is sufficiently tight in character to cause the slide holding ring 25 to rotate with the record unless that ring is restrained, and yet sufficiently loose upon the record to permit the record to freely rotate inside the clips when the slide ring is physically restrained from rotation. This arrangement permits the record to rotate at the proper speed for reproduction purposes, and also permits the slide holder ring 25 to rotate a fractional revolution at predetermined intervals, so that the slides may be kept in synchronism with the production on the record.

With reference now to Figs. 1 and 2, it will be seen that reproduction from the record may be obtained in a known manner by way of a suitable pivoted pickup arm 37 which may carry a crystal type pickup or the equivalent in its forward end having a needle 38 associated therewith. When not in use the arm may be disposed upon a rest 39 mounted on the top of the partition 16. From this disclosure it will be especially noted that the slide carrier ring 25 does not interfere in any manner with the placing of the pickup arm at the start of play nor with the inward swing of that pickup arm as it follows the record groove.

Figure 3:
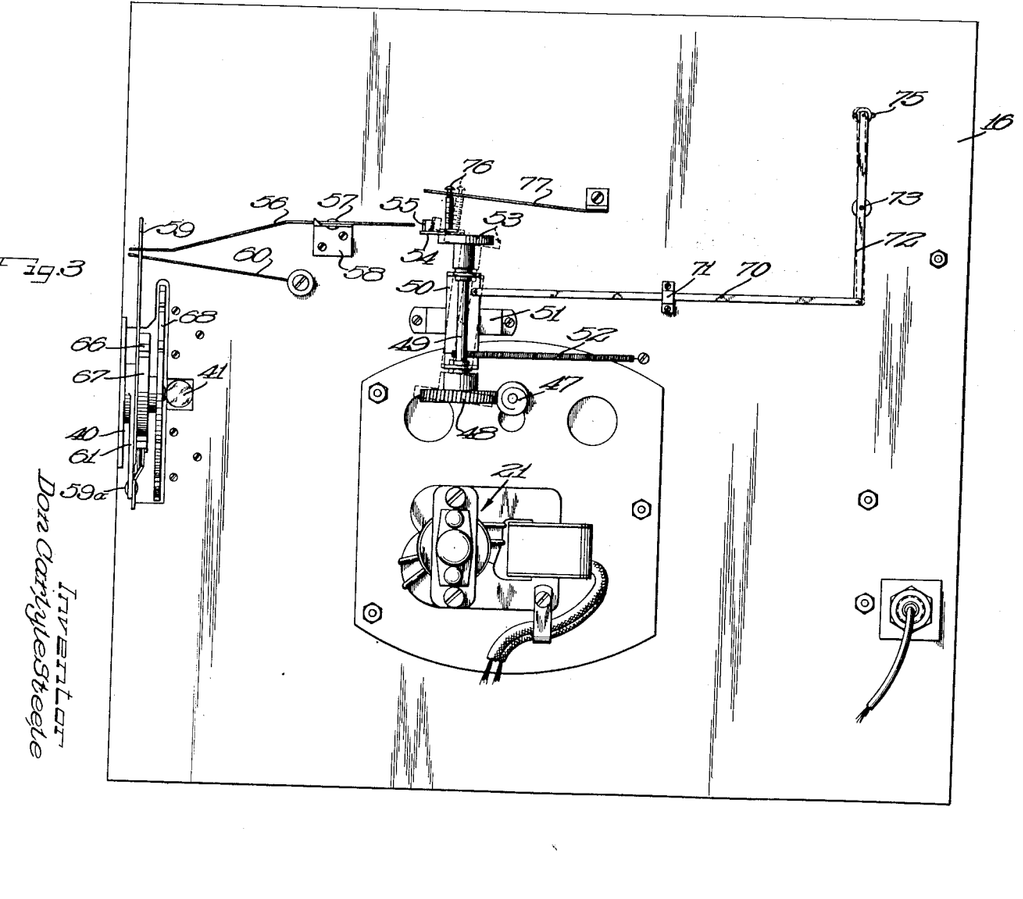
Figure 3 is an enlarged bottom plan view of the platform, showing the same in the same position it is seen in Fig. 2, and disclosing the drive motor, initial setting, and indexing mechanism carried by that platform.
Figure 4:
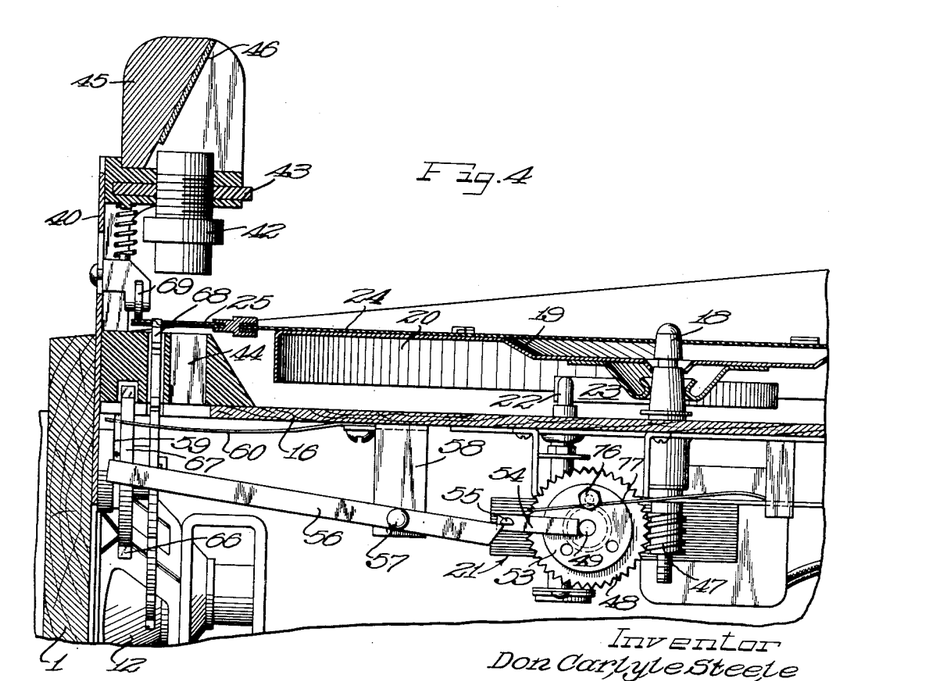
Figure 4 is an enlarged fragmentary longitudinal vertical sectional view illustrating the indexing mechanism and a part of the projecting mechanism, this figure being an enlargement of the upper left hand portion of Fig. 2.

Now with reference more particularly to Fig. 4, it will be noted that the partition 16 carries an upright frame portion 40 substantially centrally of its forward edge. This frame structure supports a lens 41 (Fig. 3) contained in a housing 42 having a threaded shank engaged by an internally threaded adjusting ring 43 by means of which the lens may be adequately focused. When the record and slide holder assembly is placed on the turntable 19, the slide holding ring projects outwardly so as to bring each successive slide 28 directly beneath the lens and over an opening 44 in the lower portion of the frame structure through which light is reflected from the aforesaid lamp 14 (Fig. 2). Thus, when a slide 28 is positioned between the opening 44 and the lens, the pictorial illustration of that slide is projected by the lens to a desired location. In the illustrated instance, a housing 45 is mounted over the lens, and an inclined mirror 46 inside that housing reflects the image onto the screen 9 carried by the cover 6 of the cabinet, as clearly illustrated in Fig. 2. Should it be desired to have the image projected upon the ceiling, it is a simple expedient to lift off the housing 45 together with the mirror, and adjust the lens so that a well defined image will appear upon the ceiling of the room. Likewise, the cover 6 may be removed from the cabinet, the mirror utilized, and the image similarly projected upon a larger screen in the room, all depending upon the desires of the operator.

The slides 28 are successively brought into projecting position by an indexing mechanism driven indirectly from the motor 21 by way of a worm 47 integral with or carried on the lower end of the turntable spindle 18 as seen in Figs. 2, 3 and 4. During operation, the worm 47 normally meshes with the worm wheel 48 carried on a shaft 49 journaled in the legs of an inverted yoke 50 centrally pivoted to a bracket 51 fixed to the underside of the partition 16. A spring 52 normally urges the pivotal yoke into such position as to maintain the gear 48 in mesh with the worm 47. At the opposite end thereof the shaft 49 carries a wheel 53 having a projecting arm 54 carrying a striker 55 on the end thereof. At each revolution of the shaft 49, the striker 55 will contact the end of a lever 56 pivoted as at 57 to a depending bracket 58, in the manner seen in Fig. 4. The outer end of the lever 56 underlies the free end of a transversely disposed rocker arm 59 normally pressed downwardly into contact with the lever 56 by means of a spring 60. The rocker arm 59 is pivoted as at 59a to the end of an arm 61 fixed to the aforesaid frame 40, Figs. 5 and 6. The arm 61 carries an inwardly extending shaft 62, and the rocker arm 59 is provided with an elongated slot 63 so as to freely move relatively to that shaft. At its pivoted end the rocker arm carries a pair of spaced inwardly projecting detents or stop elements 64 and 65. These detents successively engage teeth 66 projecting from an escapement wheel 67 fixedly connected to a larger capstan or sprocket wheel 68, the teeth of which engage in the apertures 29 adjacent the circumferential edge of the slide holding ring 25. As seen in Fig. 4, a freely mounted roller 69 carried by the frame 40 contacts the outer edge of the slide holding ring and maintains positive engagement of the ring with the sprocket wheel 68.

Figures 5, 6:
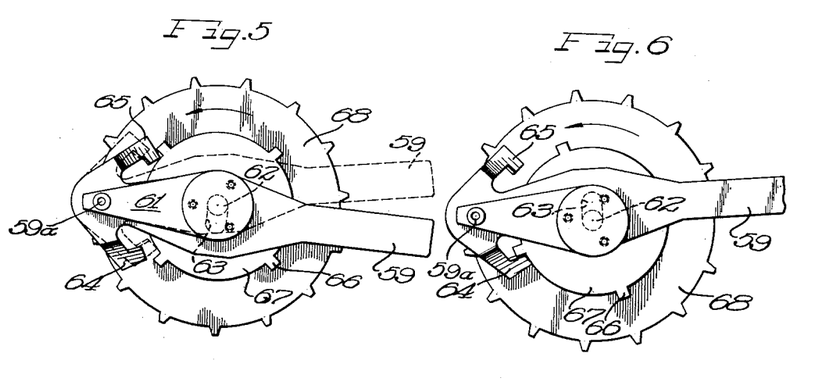
Figure 5 is a somewhat diagrammatic view of a portion of the indexing mechanism indicating the operation in dotted lines.
Figure 6 is a view similar in character to Fig. 5 illustrating the indexing mechanism in a different position of operation.

The operation of the indexing mechanism will now be described. Obviously, the record must rotate at a greater rate of speed than the intermittently movable slide holding ring 25. As stated above, without restraint, the slide holding ring will rotate with the record, but when the ring is restrained, the record rotates inside the clips 30. The parts of the indexing mechanism are normally in the position seen in Fig. 5, in the full line showing, with the detent 65 engaging a tooth 66 of the wheel 67 and thereby locking the sprocket wheel 68 in position, this sprocket wheel restraining the slide holding ring 25 and preventing rotation of it. After a predetermined interval, depending upon the reduction provided by the gears 47 and 48, the striker 55 carried by the wheel 53 will pivot the lever 56 and cause it to move the rocker arm 59 to the dotted line position seen in Fig. 5, thereby releasing the detent 65 from its engagement with a tooth 66, and moving the detent 64 into position to engage that same tooth as the sprocket wheel 68 and the wheel 67 rotate in unison by virtue of the movement of the slide holding ring 25 along with the record. The slide holding ring will then advance until that same tooth 66 contacts the detent 64 as seen in Fig. 6, but by that time the striker 55 has passed off the lever 56, and the spring 60 restores the rocker arm 59 to the full line position seen in Fig. 5, so that the detent 65 will stop rotation of the slide ring by engaging the next approaching tooth 66 on the wheel 67. The next slide on the carrier ring 25 is then in position for projection. All this operation is entirely automatic and does not require any aid from the operator, and the slides are successfully advanced in perfect synchronism with the production being reproduced from the record.

Means are also provided to insure a proper setting of the indexing mechanism at the start of each record. With reference to Fig. 3, it will be seen that these means include a link 70 slidable through a stirrup 71 secured to the underside of the partition 16. The inner end of the link 70 is pivoted to the aforesaid yoke 50 and the other end is pivotally connected to one end of a lever 72 intermediately pivoted as at 73 to a stud carried by the partition 16. The other end of the lever 72, with reference to Fig. 1, carries a button 74 the shank of which extends through a slot 75 in the partition so that the button is accessible above the partition. It will also be noted from the showing in Fig. 3 that the wheel 53 has a stud 76 projecting outwardly therefrom, and a spring 77 bears against that stud tending to constantly urge it upwardly.

At the start of an operation, when the record has been placed upon the turntable, and before it has been started, the operator merely pushes the button 74 to one side, thus pivoting by way of the lever 72 and link 70 the yoke 50 carrying the gear 48, throwing the gear out of engagement with the worm wheel 47 and permitting the spring 77 to rotate the shaft 49 and the wheel 53 until the projecting member 76 is in uppermost position. Regardless of what position the wheel 53 may be in at the time the button 74 is pressed sidewise, the spring 77 will cause the wheel 53 carrying the striker 55 to assume proper position so that substantially a full revolution of the wheel 53 is required before the striker will effect an operation of the indexing mechanism in the manner above described.

Figure 7:
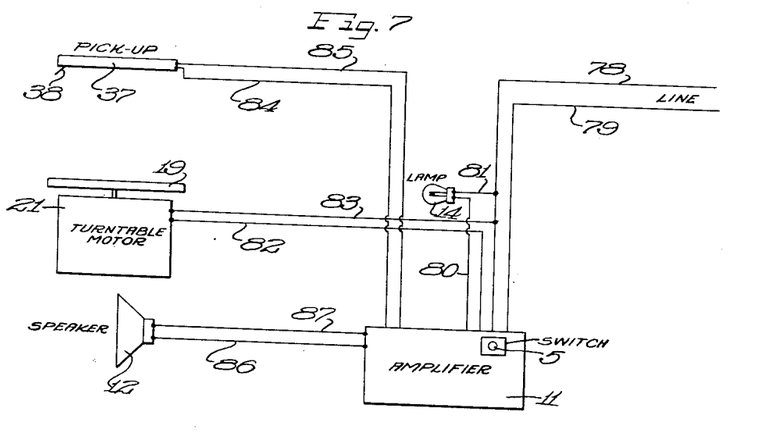
Figure 7 is a schematic wiring diagram for the device.

With reference now to Fig. 7 it will be seen that the electrical circuit for the instant invention is rather a simple one. A pair of line conductors 78 and 79 may be connected with any suitable convenience outlet, and these conductors are connected to the amplifier 11 in a well known manner. The lamp 14 is connected to the amplifier by a conductor 80, and to one of the line conductors by a lead 81. The turntable motor is connected to the amplifier and a line conductor by leads 82 and 83 respectively. The pickup means 37 is connected to the amplifier in the usual manner by conductors 84 and 85; and the speaker is also connected to the amplifier in the usual manner by conductors 86 and 87. The switch knob 5 also associated with the amplifier effects a three position control including an "off" position; an "on" position for the amplifier and turntable motor only; and an "on" position for the amplifier, turntable, and lamp. Of course, nothing is operable in the "off" position, and in the second mentioned position the device functions as a record player only, while in the third mentioned position the device functions both as a record player and a slide projector.

In operation, the instant invention is extremely simple yet highly efficient. It is only necessary for the operator to take the record and slide holding assembly, handle it as a unit in the manner a record only may be handled, adjust the slide holder until the gauge marks 36 are in alignment, and place the record on the turntable. The switch 5 may be turned, the needle 38 placed upon the record, and as the record plays, the slides are automatically and successively indexed into position for projection. No attention from the operator is required, and any suitable automatic stop means may be employed, if so desired, to stop the record when the needle reaches the end of the groove.

While the present invention is highly desirable for use in the entertainment of children for the simultaneous reproduction and illustration of Mother Goose rhymes and fairly tales, it must not be assumed that this invention is of the character of a toy. It is clearly a self-contained device, may readily be transported from place to place, and has a multitude of uses. For example, it may be used for the entertainment of adults as well as children, with the proper slides to illustrate various types of recordings. Also, it may be used in the business world to both describe and illustrate new items of manufacture; for the instruction and education of salesmen; and it is obvious that the invention is of great value in schools, institutions, colleges, and other educational establishments.

The combined record playing and slide projecting device is simple in construction, exceptionally easy to operate, durable, and may be economically manufactured and used.

It will be understood that modification and variations may be effected without departing from the scope of the novel concepts of the present invention.

I claim as my invention:

1. In a combined record playing and slide projecting device, record playing means including a turntable and prime mover therefor, slide projecting means adjacent to but outside said turntable, a disc type record, a slide carrier in the form of a flat ring circumscribing said record and extending into the range of said projecting means, friction means connecting the inner periphery of said slide carrier to the other periphery of said record for relative rotation in assembly therewith, and indexing means for intermittently advancing said carrier a complete revolution and including detent means spaced radially of said turntable to restrain movement of said carrier except for periodic intervals to successively bring slides into the range of said projecting means.

2. In a record and slide carrier assembly, a disc type record, a slide carrying ring circumscribing said record, and friction clips connecting said ring to the edge of said record to form a unitary assembly and a soft lining in said clips to engage the record and permit relative movement between the record and ring.

3. In a record and slide carrier assembly, a disc type record, a slide carrying ring circumscribing said record, and friction clips connecting said ring and record to form a unitary assembly, each of said clips including a pair of fixed inwardly extending jaws lined with a soft material for embracing a marginal edge portion of the record.

4. In a combined sound reproducer and visual image projector, a record member having a surface portion impressed with a sound track and an annular surface portion marginal thereto, an annular carrier for a series of images having its inner periphery frictionally supported concentrically of said record member by said annular surface portion, drive means for rotating said record member and said carrier, means for reproducing recorded sound including a pick-up head for following said sound track, said record member being rotatable relative to said carrier, and peripheral indexing means for engaging said carrier to restrain its rotation and intermittently releasing said image carrier temporarily to move with the record member, thereby to advance said carrier for successive projection of the images.

5. In a combined sound reproducer and visual image projector, a record disc having a surface portion impressed with a spiral sound track and a surface portion marginal thereto, an annular carrier for a series of images circumscribing said record disc and secured to said marginal surface portion remotely from said sound track for rotation relative to said disc, drive means for rotating said record member and said carrier, friction means resisting relative rotation of said carrier and said record disc, and indexing means including detent means tangentially engaging said image carrier against rotation with said disc, release means periodically actuated by said drive means to free said carrier for rotation with said record disc and reset means operatively connected to said periodic release means to set the same to begin a period.

6. A slide carrier for assembly with a disc type record, which comprises a flat ring member, an annular series of visual slides carried by said ring member, and spaced clips carried on the inner periphery of said ring member, said clips having record gripping surfaces lined with an acoustically soft material.

7. In a combined sound reproducer and slide projector, a record player including drive means and a turntable rotated thereby, and slide indexing means including a normally locked sprocket wheel rotatable in a plane spaced from said turntable on an axis radial thereof, release means periodically actuated by said drive means to free said sprocket wheel for limited rotation, and manual reset means operatively connected to said release means for presetting the same to begin a period.

8. In a combined sound reproducer and image projector, a record disc having a surface portion impressed with a spiral sound track and a surface portion marginal thereto, an annular carrier for a series of images circumscribing said record disc and secured to said marginal surface portion remotely from said sound track for rotation relative to said disc, thereby to form a unitary assembly, friction means for resisting relative rotation of said carrier and said record disc, a player for said record disc including drive means and a turntable rotated thereby, slide indexing means including a normally locked wheel rotatable in a plane spaced from said turntable for engaging and arresting rotation of said carrier, release means periodically actuated by said drive means to free said wheel for limited rotation, thereby to advance said carrier, and manual reset means operatively connected to said release means for presetting the same to begin a period of carrier advancement.

9. In a device for reproducing a combined sound and image disc, a disc player including drive means, and a disc-supporting turntable rotated thereby, a capstan and an idler roller arranged adjacent said turntable to engage on opposite sides of a disc thereon, an escapement wheel connected with said capstan for alternately locking and releasing the same, and timer means for controlling said escapement wheel in synchronism with operation of said record player.

10. In a device for reproducing a combined sound and image disc, a disc player including drive means and a disc-supporting turntable rotated thereby, a capstan and an idler roller arranged adjacent said turntable to engage on opposite sides of a disc thereon, an escapement wheel connected with said capstan for alternately locking and releasing the same, and escapement release means in geared down driving connection with said drive means to control said escapement wheel in synchronism with operation of said record player.

11. An image carrier for assembly with a disc record, which comprises a flat ring member, and a plurality of spaced apart clips extending inwardly from the inner periphery of said ring member, said clips together defining an inwardly opening socket in which the edge of a disc record may be received.

12. In combination, a disc record, an annular flexible image carrier circumscribing said disc record, a plurality of spaced apart clips carried by said image carrier, said clips extending inwardly and having inwardly opening sockets to detachably receive the edge of said disc record, said disc record being rotatable relative to said carrier when assembled therewith.

13. In a combined sound reproducer and visual image projector, a record disc having a surface portion carrying a sound track and a marginal surface portion around the sound track, an annular carrier for a series of images circumscribing the record disc, connecting means on the inner edge of said annular carrier for frictional surface contact with said marginal portion of the record, and soft material on said connecting means to frictionally and lightly engage the record disc to cause movement of the carrier with the record and permit movement of the record disc alone when the carrier is restrained.

14. In a combined sound reproducer and visual image projector, a record disc having a surface portion carrying a sound track and a marginal surface portion around the sound track, an annular carrier for a series of images circumscribing the record disc, connecting means on the inner edge of said annular carrier for frictional surface contact with said marginal portion of the record, and soft material on said connecting means to frictionally and lightly engage the record disc to cause movement of the carrier with the record and permit movement of the record disc alone when the carrier is restrained, and restraining means timed to engage the carrier periodically and hold it from movement while the record disc continues to rotate.

(References on following page)

References Cited in the file of this patent

UNITED STATES PATENTS

| Number | Name | Date |
|---|---|---|
| 642,163 | Schroeder | Jan. 30, 1900 |
| 745,218 | Mensing | Nov. 24, 1903 |
| 931,184 | Davis | Aug. 17, 1909 |
| 971,891 | Hoglund | Oct. 4, 1910 |
| 1,482,387 | Donaldson | Feb. 5, 1924 |
| 1,584,708 | Billing | May 11, 1926 |
| 1,591,081 | Curtis | July 6, 1926 |
| 1,658,030 | Adams | Feb. 7, 1928 |
| 1,696,831 | Baker | Dec. 25, 1928 |
| 1,864,519 | Boularan et al. | June 28, 1932 |
| 1,913,913 | Boularan et al. | June 13, 1933 |
| 1,929,173 | Koch | Oct. 3, 1933 |
| 1,977,293 | Shapiro | Oct. 16, 1934 |
| 2,070,226 | Erwood | Feb. 9, 1937 |
| 2,092,761 | Klein | Sept. 14, 1937 |
| 2,203,437 | Levy | June 4, 1940 |
| 2,279,119 | Freimann | Apr. 7, 1942 |
| 2,314,417 | Neal | Mar. 23, 1943 |

FOREIGN PATENTS

| Number | Country | Date |
|---|---|---|
| 13,734 | Great Britain | of 1913 |